United States Patent Office 3,835,044
Patented Sept. 10, 1974

3,835,044
PROCESS FOR SEPARATING NEPTUNIUM FROM THORIUM
Wallace W. Schulz, Richland, Wash., assignor to the United States of America as represented by the United States Atomic Energy Commission
No Drawing. Filed Oct. 16, 1972, Ser. No. 298,135
Int. Cl. C02b 1/56
U.S. Cl. 210—37                8 Claims

ABSTRACT OF THE DISCLOSURE

A process is disclosed for separating neptunium from thorium in aqueous solution which comprises contacting the aqueous solution with a weak-base anion exchange resin whereby the neptunium is preferentially adsorbed on the weak-base anion exchange resin to a greater extent than for the strong-base (quaternary group) resins hitherto used. The process is particularly useful in separating and recovering neptunium from atomic energy plant feed solutions comprising neptunium, uranium, thorium, protactinium, niobium, ruthenium, rhodium and zirconium. The preferred weak-base anion exchange resins are of the macroreticular type such as those disclosed in British Pat. 932,125.

CONTRACTUAL ORIGIN OF THE INVENTION

The invention described herein was made in the course of, or under, a contract with the United States Atomic Energy Commission.

BACKGROUND OF THE INVENTION

The invention relates to a process of removing neptunium from aqueous solutions containing thorium, and especially the invention relates to the recovery of substantially pure neptunium from aqueous feed solutions containing neptunium, uranium, thorium, ruthenium, rhodium, zirconium, niobium and protactinium, as for example the feed solutions being concentrated and purified in the Hanford and Savannah River plants run under contract with the United States Atomic Energy Commission.

Such feed solutions are currently being concentrated and purified by flowing them through beds of microreticular strong-base (quaternary ammonium groups) anion exchange resins. One of the strong-base anion exchange resins being used for this purpose is the resin sold by Dow Chemical Co. under the trademark "Dowex 21K."

Although the strong-base exchangers have generally been adequate, they do have a number of disadvantages when used to purify neptunium. Foremost of these is their inability to separate neptunium cleanly from thorium. Feed to Hanford and Savannah River plant ion exchange purification units contains, typically, 0.5 to 1 g./liter thorium; but, in some cases, as after a preceding thorium campaign, can range as high at 80 g./liter thorium. With such feed, time consuming and expensive special loading and elution procedures are required with strong-base resins for adequate separation of neptunium and thorium, and purification is achieved only at the expense of large (as high as 80%) neptunium losses.

Other disadvantages of the strong-base exchangers include their relatively high cost and the "tailing" which occurs during elution of neptunium. Neptunium in these tail fractions must be recycled for recovery. Failure of the neptunium to elute in a sharp band makes it difficult for process operators at Hanford to judge when to start and stop collection of concentrated product.

SUMMARY OF THE INVENTION

I have discovered an improved neptunium ion exchange process which overcomes the above disadvantages. The key element in the new process is the contacting of the aqueous solution comprising neptunium and thorium with a weak-base anion exchange resin, preferably the macroreticular or macroporous type.

In accordance with this invention an aqueous solution comprising neptunium and thorium is contacted with a weak-base anion exchange resin whereby neptunium is preferentially adsorbed on the resin. In one embodiment of the invention the aqueous solution comprising neptunium and thorium is flowed through a bed of particles of the weak-base anion exchange resin in a column. The neptunium may be recovered from the resin in various ways, such as by elution with dilute aqueous solutions of nitric acid, or other reagents which will dissolve the adsorbed neptunium without adversely affecting the resin as is known for the recovery of neptunium and thorium adsorbed on a strong base anion exchange resin.

The solution comprising neptunium and thorium may contain other materials including uranium, protactinium, niobium, ruthenium, rhodium and zirconium, and the other fission products present in neutron irradiated uranium. The process of this invention using weak-base anion exchange resins concentrates the neptunium by adsorbing the neptunium to a greater extent than the foreign materials present in the solution.

The aqueous solution comprising neptunium and thorium is preferably a 6 to 8 molar nitric acid solution. It should contain ferrous sulfamate and hydrazine, which are usually present in Hanford and Savannah River feed solutions, or other reducing agent to stabilize neptunium in the tetravalent state. The neptunium under such conditions exists as an anionic complex $[Np(NO_3)_6]^{-2}$.

The concentration and proportion of ingredients are not critical and neither is the rate of flow and time of contact with the weak-base anion exchange resin. These may be varied widely from those given in the tables which are only illustrations of the invention, which is based on the discovery that greatly superior preferential adsorption of neptunium over thorium, uranium, fission products, and other materials mentioned herein, are obtained by using weak-base anion exchange resins for concentration, purification and recovery of neptunium instead of the strong-base (quaternary functional group) microreticular anion resins hitherto used.

The preferred weak-base anion exchange resins are those having tertiary amine functional groups, particularly those in which all or most of the functional groups are tertiary amine groups. Weak base anion exchange resins having primary and secondary amine groups may also be used.

The resin matrix to which the functional groups are attached is preferably a cross linked copolymer containing a plurality of $CH_2=C<$ groups in nonconjugated relationship and a monoethylenically unsaturated monomer. The best all around results have been obtained with the macroreticular weak-base anion exchange resins of the above type, especially those having tertiary amine functional groups.

Suitable macroreticular weak-base anion exchange resins are disclosed in British Pat. 932,125, published July 24, 1963, particularly page 7, lines 66–75; page 12, Example X, and page 13, Example XVII, the disclosure of which is hereby incorporated by reference.

A suitable microporous anion exchange resin having tertiary amine functional groups is also shown in Example 15 of U.S. Pat. 3,418,262, the disclosure of which is hereby incorporated herein by reference.

Suitable microreticular weak-base anion exchange resins are disclosed in British Pat. 654,706, which is hereby incorporated by reference; see especially Example 7 thereof.

A generic description of the preferred cross linked macroreticulated ion exchange resins used in this invention is given in Claim 3 of British Pat. 932,125 as supported by the disclosure in British Pat. 932,125. As set forth in this claim and the disclosure in the patent, the resin is a polymerized mass composed of a cross linked copolymer of (1) polyunsaturated monomer containing a plurality of $CH_2=C<$ groups in nonconjugated relationship and (2) monoethylenically unsaturated monomer, wherein said polymerized mass is constituted by an aggregation of micro beads which is resistant to physical stress, the aggregated micro beads being visible in an electron photomicrograph and defining a retention of microscopic channels extending through the mass, said mass having weak-base, preferably tertiary amine, ion exchange groups thereon. In the conventional cross linked weak-base anion exchange resins, the pores are not visible in electron photomicrographs.

A preferred type of resin is one in which the copolymer is a copolymer of monomers containing styrene and from 8–25 percent by weight of divinyl benzene.

The particle size of the resins is not critical, suitably being from −8 mesh to +100 mesh (U.S. Standard Screen), 14 mesh to 50 mesh being generally used.

In addition to the weak-base anion exchange resins of the type shown in British Pats. 654,706 and 932,126 the older type of weak-base anion exchange resins may be used. These are designated as polyethylene polyamine methylene-substituted resins of diphenylol dimethylmethane. Resins of this type and methods of making them are well known and are, for example, disclosed on pages 19–30 of Ion Exchange and Adsorption Agents in Medicine by Gustav J. Martin, published Mar. 25, 1955. A weak-base anion exchange resin of this type is Amberlite IR-4B, sold by Rohm & Haas.

Weak-base anion exchange resins which have been used in separating neptunium from thorium in Hanford feed solutions, and which have been found to be satisfactory, are given in Table I below:

stantially the same as the product disclosed in Example X of this patent. The general physical and chemical properties of XE-270 are listed in Eng. & Mining Technology, pp. 73–79 of July 1969.

Resin FPS-4024L is believed to be substantially the same as that of Example 15 of U.S. Pat. 3,418,262 and is a tertiary amine group resin, as disclosed in column 3, lines 26–30 of this patent.

The binding forces of the weak-base anion exchange resins for thorium, and particularly the Th(IV) species which is present in feed solutions with neptunium, are weaker than those of the strong base (quaternary ammonium functional groups) anion exchangers of which Dowex 21K is an example. This weaker binding force permits selective and efficient loading of neptunium from feed solutions containing very high concentrations of thorium. For example, from a feed containing 5 g./liter neptunium and 40 to 80 g./liter thorium, 97 percent of the neptunium can be loaded while 80 to 90 percent of the thorium passes out with the aqueous raffinate. Subsequently, following acid fluoride washes, a concentrated $^{237}Np$ product containing less than 3 wt. percent thorium can be readily produced. Overall (feed to product) thorium decontamination factors as high as 150 can be achieved with the XE-270 resin and similar weak-base anion exchange resins.

Another advantage for the XE–270 and similar resins, which also accrues from its weaker binding force, is that essentially all the neptunium can be eluted in a single column volume of eluant. There is none of the tailing experienced in eluting neptunium from strong-base resin.

In addition to the foregoing advantages weak-base anion exchange resins cost only about one-fifth as much as the strong-base exchangers.

Results in Table II illustrate the superior decontamination performance provided by the XE–270 resin over the 21K resin. [Conditions used to obtain the data in Table II are listed in Table III.] In addition to the excellent thorium decontamination already cited, the XE–270 resin provides outstanding purification of the $^{237}Np$ from $^{233}Pa$, $^{95}Zr$-$^{95}Nb$, and $^{106}Ru$-$^{106}Rh$. Alpha energy data also show

TABLE I.—SELECTED RESIN PROPERTIES

| | Resin | | | |
|---|---|---|---|---|
| Designation | XE-270 | A-21 | FPS 4024 L | AG-3-X44A |
| Manufacturer | Rohm & Haas | Rohm & Haas | Dow Chemical | Dow Chemical. |
| Property: | | | | |
| Type | Weak base | Weak base | Weak base | Weak base. |
| Active group | Tertiary amine | Tertiary amine | Tertiary amine | Tertiary amine. |
| Structure | Macroreticular | Marcroreticular | Macroporous styrene divinylbenzene matrix. | Microreticular. |
| Mesh range | 20-50 | 14-50 | 20-50 | 20-50. |
| Ionic form | Hydroxide | Hydroxide | Hydroxide | Chloride. |

In the above table XE–270 and A–21 are made in accordance with the disclosure in British Pat. 932,125, and to the best of my knowledge and information are subthat the $^{237}Np$ product from the XE–270 resin contain significantly less plutonium and americium than that from the 21K resin. Tables II and III are given below:

TABLE II.—PURIFICATION OF NEPTUNIUM FROM THORIUM WITH VARIOUS ANION EXCHANGE RESINS

| | Resin | | | | |
|---|---|---|---|---|---|
| | XE-270 | A-21 | FPS 4024 L | AG-3-X44A | 21K [a] |
| Property: | | | | | |
| Np recovery, percent [b] | 79 | 44 | 72 | 6.0 | 73 |
| Product Np conc., g./liter | 27.6 | 15.8 | 29.5 | 2.15 | 13.2 |
| Th DF [c] | 140 | 44 | 25 | 6 | 3 |

[a] At 40° C., all others at 25° C.
[b] In most concentrated column volume of eluent solution.

[c] Decontamination factor = $\dfrac{\text{Th, g./liter feed}}{\text{Np, g./liter feed}} \times \dfrac{\text{Np, g./liter product}}{\text{Th, g./liter product}}$ TABLE III.—OPERATING CONDITIONS FOR RESIN STUDIES [a]

| | Number of col. vols. | Flow rate, ml. cm.$^{-2}$ min.$^{-1}$ [c] | Composition [b] | | | |
|---|---|---|---|---|---|---|
| | | | $HNO_3$, M | $N_2H_4$, M | $FeSA_2$,[d] M | NaF, M |
| Feed | 9 | 0.637 | 6.3 | 0.01 | 0.1 | 0.0 |
| Wash 1 | 10 | 3.185 | 7.0 | 0.05 | 0.0 | 0.01 |
| Wash 2 | 3 | 3.185 | 8.0 | 0.0 | 0.0 | 0.0 |
| Eluent | 5 | 0.637 | 0.3 | 0.0 | 0.0 | 0.0 |

[a] For results listed in Table IV; all resins converted to $NO_3$-form before use.
[b] Feed also contained 3.9 to 5.0 g./liter Np and 35 to 40 g./liter Th.
[c] Column height-to-diameter ratio was 10.
[d] Ferrous sulfamate.

Evidence that the neptunium elution band on the XE–270 resin is much tighter than it is on strong-base resin is presented in Table IV and also in Table II. Essentially all the neptunium remaining on the XE–270 resin following load and wash steps is removed from the resin in the second column volume of eluent solution to pass through the resin. Again because of weaker binding forces, wash solutions, especially those containing fluoride, remove considerably more neptunium from XE–270 resin than from strong-base exchangers (Table IV). The amount of neptunium lost to the washes can be minimized by limiting their volume and composition. In the Hanford Purex plant provision is already made for recovering neptunium from ion exchange resin wash solutions by recycling to a previous point in the process. Table IV is given below:

TABLE IV.—TYPICAL DISTRIBUTION OF NEPTUNIUM FOR DOWEX 21K AND AMBERLITE XE–270 RESINS

| | Percent neptunium | |
|---|---|---|
| | Dowex 21K, 40° C. | Amberlite XE–270, 25° C. |
| Load cycle [a] | 0.1 | 1.6 |
| Wash A [b] | 1.2 | 16.3 |
| Wash B | 0.2 | 2.5 |
| Elute waste (before and after cuts) | 21.4 | 2.2 |
| Product | 72.5 | 86.0 |
| Total | 95.4 | [c]108.0 |

[a] Feed did not contain Th.
[b] Washes A and B correspond to Washes 1 and 2, Table I.
[c] Not 100% because of analytical imprecision.

Data from plant scale operations (Table V) confirm that weak-base anion exchange resins and particularly the macroreticular type provide excellent decontamination of neptunium from uranium and fission products, as well as from thorium. Table V is given below:

TABLE V

Purification of $^{237}$Np with XE–270 resin, typical Hanford Purex plant experience

| | Run number | | | | | |
|---|---|---|---|---|---|---|
| | 1 | 2 | 3 | 4 | 5 | 6 |
| Property: | | | | | | |
| Np recovery, percent | 76 | 92 | 89 | 72 | 81 | 78 |
| DF's [a]: | | | | | | |
| U | 32,000 | 192,000 | 173,000 | 600 | 2,580 | 189,000 |
| $^{234}$Th | 620 | 1,360 | >77 | 440 | 115 | 520 |
| $^{232}$Th | 350 | 800 | | | | |
| $^{106}$Ru-$^{106}$Rh | 530 | 24 | | | | |
| $^{95}$Zr-$^{95}$Nb | 100 | 220 | 17 | 70 | 150 | 30 |
| $^{233}$Pa | 10 | 14 | 6 | 5 | 100 | 24 |

[a] Decontamination factors.

A typical composition of feed used in the process described above is given in Table VI below:

TABLE VI

Typical composition of feed to Hanford Purex plant neptunium ion exchange package

| Component: | | Composition |
|---|---|---|
| $HNO_3$ | M | 6–7 |
| Np | g./liter | 5–6 |
| U | do | 1–8 |
| $^{232}$Th | do | 0.2–59 |
| $^{234}$Th | μCi/liter | 9,000–20,000 |
| $^{106}$Ru-$^{106}$Rh | do | 50–900 |
| $^{95}$Zr-$^{95}$Nb | do | 150–40,000 |
| $^{233}$Pa | do | 1,000–6,000 |

The embodiments of the invention in which an exclusive property or privilege is claimed are defined as follows:

1. The process of separating neptunium from thorium in aqueous nitric acid solutions wherein the neptunium is present as an anionic complex in which the anion is $[Np(NO_3)_6]^{-2}$ and the solution contains a reducing agent to stabilize the neptunium in the tetravalent state which comprises contacting said aqueous solution with a weak-base anion exchange resin.

2. A process according to Claim 1 in which the weak-base anion exchange resin is a polymerized mass comprised of a cross linked copolymer of (1) polyunsaturated monomer containing a plurality of $CH_2=C<$ groups in nonconjugated relationship and (2) monoethylenically unsaturated monomer, said mass having amine ion exchange groups.

3. A process according to Claim 2 wherein the copolymer is a copolymer of monomers containing styrene and 8-25 percent by weight of divinyl benzene.

4. A process according to Claim 2 wherein the majority of the ion exchange groups are tertiary amine groups.

5. A process according to Claim 2 wherein the aqueous solution comprises neptunium, thorium, uranium, protactinium, niobium, ruthenium, rhodium and zirconium.

6. A process according to Claim 1 wherein the weak-base anion exchange resin is macroreticular.

7. A process in accordance with Claim 2 wherein the polymerized mass is constituted by an aggregation of microbeads, the aggregate microbeads being visible in an electron photomicrograph and defining a network of microscopic channels extending through the mass.

8. A process according to Claim 2 wherein the amine ion exchange groups are tertiary amine groups.

References Cited

UNITED STATES PATENTS 3,047,360   7/1962   Sheppard _____ 23—312 ME
3,432,276   3/1969   Reas _____ 423—7

OTHER REFERENCES

"Analytical Chemistry," Vol. 37, No. 11, October 1965, pp. 1440–1.

"Journal of Chromatography," Vol. 14 (1964), pp. 258–260.

Uuclear Science Abstracts, Vol. 17, No. 24; Abstract #40925.

"An Analytical Method for Neptunium-237 Using Anion Exchange," F. P. Roberts, U.S. Atomic Energy Commission, #HW–59032, January 1959.

SAMIH N. ZAHARNA, Primary Examiner

I. CINTINS, Assistant Examiner

U.S. Cl. X.R.

423—7, 250